(12) United States Patent
Makino (10) Patent No.: US 7,156,596 B2
(45) Date of Patent: Jan. 2, 2007

(54) BLIND RIVET AND FASTENING METHOD

(75) Inventor: Takanori Makino, Toyohashi (JP)

(73) Assignee: Newfrey LLC, Newark, DE (US)

( * ) Notice: Subject to any disclaimer, the term of this patent is extended or adjusted under 35 U.S.C. 154(b) by 3 days.

(21) Appl. No.: 10/417,572

(22) Filed: Apr. 17, 2003

(65) Prior Publication Data

US 2003/0215303 A1 Nov. 20, 2003

(30) Foreign Application Priority Data

Apr. 26, 2002 (JP) ............................. 2002-125788

(51) Int. Cl.
*F16B 13/04* (2006.01)
*F16B 19/00* (2006.01)
*F16B 39/00* (2006.01)

(52) U.S. Cl. .................... 411/34; 411/37; 411/107; 411/361

(58) Field of Classification Search ................ 411/34, 411/37, 361, 107
See application file for complete search history.

(56) References Cited

U.S. PATENT DOCUMENTS

| | | | | | |
|---|---|---|---|---|---|
| 2,887,003 A | * | 5/1959 | Brilmyer | ...................... | 411/34 |
| 3,107,572 A | * | 10/1963 | Orloff | ........................... | 411/34 |
| 3,253,495 A | * | 5/1966 | Orloff | ........................... | 411/34 |
| 4,230,017 A | * | 10/1980 | Angelosanto | ................ | 411/34 |
| 4,781,501 A | * | 11/1988 | Jeal et al. | ...................... | 411/43 |
| 4,810,142 A | * | 3/1989 | Briles | ......................... | 411/43 |
| 4,844,673 A | * | 7/1989 | Kendall | ........................ | 411/34 |
| 4,865,499 A |   | 9/1989 | Lacey | ........................... | 411/34 |
| 4,907,922 A | * | 3/1990 | Jeal et al. | ...................... | 411/43 |
| 6,537,005 B1 | * | 3/2003 | Denham | ...................... | 411/42 |

FOREIGN PATENT DOCUMENTS

| | | | |
|---|---|---|---|
| EP | 0 663 535 A1 | 7/1995 | |
| EP | 0 945 631 A2 | 9/1999 | |
| JP | 63-254212 | 10/1988 | |
| JP | 4-95109 | 8/1992 | |
| JP | 7-290183 | 11/1995 | |
| WO | WO86/06447 | * 11/1986 | .................. 411/34 |

* cited by examiner

*Primary Examiner*—Lloyd A. Gall
(74) *Attorney, Agent, or Firm*—Harness, Dickey & Pierce, P.L.C.

(57) ABSTRACT

A blind rivet (1) includes a rivet body (3) having a rivet body flange (2) integrally formed therewith, and a mandrel (5) passing through the rivet body and protrudes from the rivet body flange. The mandrel (5) has a large diameter head (6) at the end of the rivet body on the opposite side of the rivet body flange. An external thread portion (13) is provided in a region of the mandrel adjacent to the rivet body flange (2). A sleeve (14) is formed separately from the mandrel (5) and the rivet body (3), and is disposed adjacent to the rivet body flange (2). The sleeve (14) includes a sleeve flange (15) for sandwiching a second attachment member (22) between the sleeve flange and a first attachment member (21), and a deformable swageable portion (17) to be deformed radially in a region of the external thread portion, so as to form an internal thread portion (33) in the inner surface thereof. The rivet body (3) and the mandrel (5) are retained as attached to the first attachment member.

18 Claims, 8 Drawing Sheets

BLIND RIVET AND FASTENING METHOD

FIELD OF THE INVENTION

The present invention relates to a blind rivet, and more particularly to a blind rivet capable of being attached to a first attachment member, such as a panel, and coupling a second attachment member to be the first attachment member, and then readily detaching the second attachment member from the first attachment member.

BACKGROUND OF THE INVENTION

There has been well known a blind rivet including a hollow tubular rivet body having a flange formed at one end thereof, and a mandrel received in the rivet body in such manner that a large diameter head of the mandrel is located on the opposite side of the flange. The mandrel can be pulled in the direction getting away from the rivet body while holding a shank of the mandrel extending on the side of the flange to allow the end of the rivet body to be expandedly deformed so as to fasten and couple a first attachment member, such as a panel, and a second attachment member, such as a mechanic component, together. If the second attachment member, such as a small component, is couple to the first attachment member, such as a large panel standing in the difficult way of inserting an operator's hand into the rear side thereof, the blind rivet provides a significant advantage of allowing such attachment members to be adequately fastened, from one side of the first attachment member.

The conventional blind rivet, however, has as a disadvantage of difficulty in releasing the fastened state according the blind rivet (or detaching the attachment members) after the attaching operation. Japanese Patent Laid-Open No. 63-254212 discloses a specialized blind rivet capable of allowing such a detaching operation. While the blind rivet disclosed in this publication has an advantage of allowing the detachment operation, the operation can be carried out only under a certain limited condition. More specifically, the detaching operation have to carried out while applying a tool not only on the front side but also on the rear side, and consequently, it is hard for only one operator to do detaching operation when the attachment member is a large panel. Japanese Utility-Model Laid-Open No. 4-095109 discloses another blind rivet comprising a rivet body, a flange formed separately from and connected to the rivet body through a thread engagement, and means attached rotatably to the flange or the rivet body. This blind rivet makes it possible not only to finish the attaching operation on one side but also to carry out the detaching operation on the same side as that in the attaching operation.

The blind rivet disclosed in the above Japanese Utility-Model Laid-Open No. 4-095109 provides an excellent workability allowing both the fastening and detaching operations to be carried out from one side. However, it is required to construct the blind rivet in a specialized structure such as the flange formed separately from and connected to the rivet body through the thread engagement. In addition, it needs an additional operation of rotating the rivet body or the flange to connect the rivet body by means of the thread engagement and the flange together.

It is therefore an object of the present invention to provide a blind rivet including a rivet body and an integrally formed flange and requiring no rotation for connection, and maintaining the fastening state between the first attachment member and the blind rivet but allowing the second attachment member to be detached from the first attachment member from one of sides of the first attachment member.

SUMMARY OF THE INVENTION

In order to achieve the above object, according to the present invention, there is provided a blind rivet comprising a hollow tubular rivet body having a flange formed at one of the ends thereof; and a mandrel having a shank passing through the rivet body and protruding from the flange and a large diameter head adjacent to the other end of the rivet body and opposite to the flange, wherein an end portion of the mandrel protruding from the flange can be pulled out from the rivet body to allow the head to deform and expand a portion of the rivet body so that the blind rivet is attached to a first attachment member such as a panel by means of the expandedly deformed portion and the flange. The mandrel has an external thread portion provided at least in such a region that after the attaching operation, the mandrel protrudes from the flange and adjacent to the flange. The blind rivet further comprises a tubular sleeve disposed adjacent to the flange to surround the mandrel portion protruding from the flange, the sleeve being formed separately from both the mandrel and the rivet body. The sleeve includes a sleeve flange for sandwiching a second attachment member between the first attachment member and the sleeve flange, and a deformable swageable portion to be deformed radially in a region facing to the external thread portion of the mandrel, so as to form an internal thread in the inner surface thereof.

According to the above structure, a strong force for pulling the rivet body out of the first attachment member can be applied to the mandrel portion protruding from the sleeve to allow the rivet body to be expandedly deformed so as to firmly fasten the first attachment member by means of the expandedly deformed portion and the rivet body flange. A strong compression force can also be applied to the swageable portion of the sleeve radially inward to form an internal thread corresponding to the external thread portion of the mandrel, in the inner surface of the swageable portion of the sleeve, so that the second attachment member can be sandwiched between the first attachment member and the sleeve flange while preventing the sleeve from axially moving with respect to the mandrel. Thus, the attaching of the blind rivet to the first attachment member and the holding of the second attachment member can be carried out from one side of the first attachment member only by the attaching operation based on axial pulling and radial compression forces but without any rotation operation. Through this attaching operation, the second attachment member can be connected to the first attachment member, and the rivet body of the blind rivet can be firmly attached to the first attachment member. This fastened state is reliably maintained. In addition, while the blind rivet of the present invention has the rivet body and the rivet body flange which are integrally formed, the sleeve connected with the mandrel through the thread engagement can be detached from the mandrel only by rotating the sleeve flange located on one side of the first attachment member or only by the rotation operation from one side, so that the second attachment member can be detached from the first attachment member after the completion of the detaching operation of the sleeve. Thus, even if the first attachment member is a large panel, the attaching and detaching operations can be completed from one side even by one operator.

In the above blind rivet, the sleeve may include an annular receiving portion extending from the sleeve flange toward a rivet body flange serving as the flange of the rivet body, and the total thickness of the receiving portion and the rivet body flange may be set depending on the thickness of the second attachment member. The sleeve may be formed with an engagement engaged with the mandrel before the deformation of the swageable portion so as to prevent the sleeve from unintentionally disengaging from the mandrel. The mandrel may formed with a breakable small diameter portion for causing breakage in the end portion of the mandrel to separate it from the remaining portion of the mandrel, and the breakable small diameter may be formed in a region of the mandrel where it protrudes from the sleeve after the attaching operation within the end portion of the mandrel.

Preferably, the outer surface of the rivet body is formed with a plurality of longitudinally extending knurls aligned in the circumferential direction of the rivet body. In this case, the rivet body flange may be formed with protrusions on the side adjacent to the first attachment member to be bitten into the surface of the first attachment member. The outer surface of the rivet body adjacent to the rivet body flange is preferably formed in a hexagonal shape or a quadrangular shape in cross section. The rivet body is preferably formed with a slit longitudinally extending in a region of the rivet body adjacent to the rivet body flange.

Preferably, either the flange or the swageable portion of the sleeve has a shape capable of defining at least one pair of parallel lines in plan view. Preferably, one of the flange of the sleeve and the swageable portion of the sleeve has a shape capable of defining at least one pair of parallel lines in plan view, and the other has an arbitrary shape including a circular shape such as perfect circle or oval, and a polygonal shape such as triangle or quadrangle.

The present invention also provides a method of connecting, to a first attachment member, a second attachment member by using any of the above blind rivets.

This method comprises the steps of:

positioning the second attachment member to the first attachment member to align a second mounting hole formed in the second attachment member with a first mounting hole formed in the first attachment member, wherein the first mounting hole has an inner diameter larger than the outer diameter of the rivet body but smaller than the outer diameter of the rivet body flange, and the second mounting hole has an inner diameter larger than that of the first mounting hole but smaller than the outer diameter of the sleeve flange;

inserting the rivet body of the blind rivet into the aligned first and second mounting holes of the first and second attachment members, while locating the head in advance until the rivet body flange is brought into surface contact with the first attachment member, and the sleeve flange is brought into surface contact with the second attachment member, so as to allow the rivet body to protrude from the rear side of the first attachment member; and applying to the end portion of the mandrel protruding from the sleeve, a strong force for pulling the end portion of the mandrel out of the first attachment member to allow the rivet body protruding from the rear side of the first attachment member to be expandedly deformed, so that the blind rivet is attached to the first attachment member by means of the expandedly deformed portion and the rivet body flange, and also applying, to the sleeve, a strong force for radially compressing the swageable portion to allow the inner surface of the swageable portion to be pressed onto the external thread portion of the mandrel and formed with an internal thread corresponding to the external thread of the external thread portion, so that the second attachment member is sandwiched between the sleeve flange and the first attachment member while preventing the sleeve from axially moving with respect to the mandrel.

BRIEF DESCRIPTION OF THE DRAWINGS

FIGS. 5A to 5C show a sleeve of the blind rivet in FIG. 1, wherein

FIGS. 7A and 7B show an attaching operation after the positioning and inserting steps in FIG. 6, wherein

FIGS. 11A and 11B show a blind rivet having a modified rivet body after the attaching operation, wherein

FIGS. 12A and 12B show a blind rivet having another modified rivet body, wherein

DETAILED DESCRIPTION OF THE PREFERRED EMBODIMENT

Figure 1:
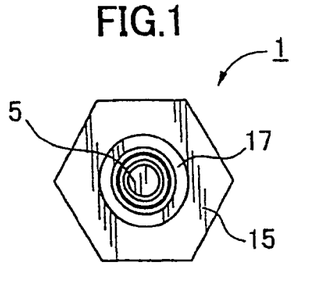
FIG. 1 is a plan view of a blind rivet according to one embodiment of the present invention.
Figure 2:
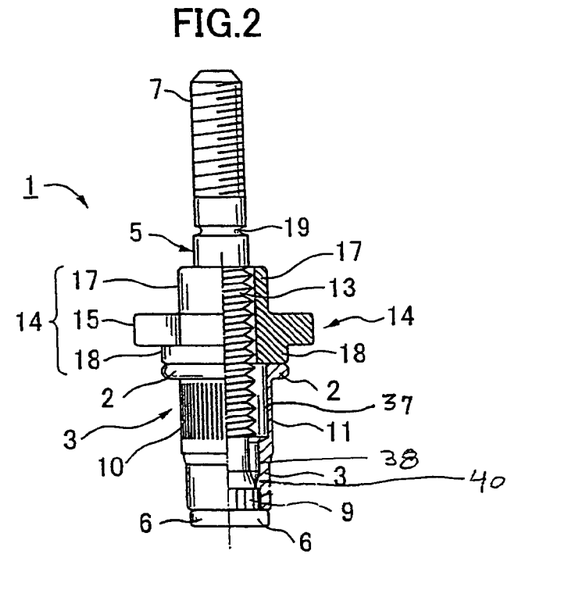
FIG. 2 is a partially half sectional view of the blind rivet in FIG. 1.
Figure 3:
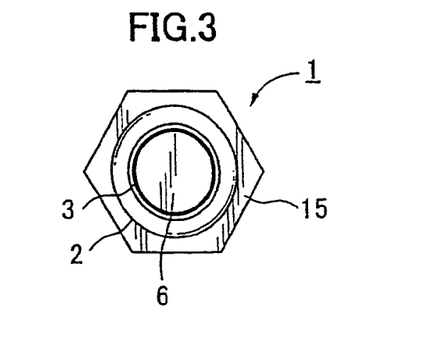
FIG. 3 is a bottom view of the blind rivet in FIG. 1.

With reference to the drawings, one embodiment of the present invention will now be described. FIGS. 1 to 3 show a blind rivet 1 according to a first embodiment of the present invention. The blind rivet 1 comprises a hollow tubular rivet body 3 having a rivet body flange 2 integrally formed with the rivet body 3 at one end thereof, and a mandrel 5 having a shank passing through the rivet body 3 and protruding from the rivet body flange 2. The rivet body 3 is separated from the mandrel 5. The rivet body 3 is made of plastically deformable material such as metal. The mandrel 5 is made of rigid material such as metal. The mandrel 5 are calked and connected to the rivet body 3 at a portion 9 of the mandrel 5 (see FIG. 2) adjacent to its large diameter head 6 in the vicinity of the other end of the rivet body 3 and opposite to the rivet body flange 2. Preferably, the end of the mandrel 5 on the opposite side of the head 6 or the end portion 7 is formed with a thread or peripheral grooves for allowing the end portion 7 to be held by a jaw of a setting tool. In the blind rivet 1, a strong force is applied to the mandrel end portion 7 protruding from the rivet body flange 2 to pull it out of the rivet body so as to allow the head 6 to expandedly deform a portion of the rivet body 3, so that the blind rivet 1 is attached to a first attachment member, such as a panel, by means of the expandedly deformed portion and the rivet body flange 2.

Figure 4:
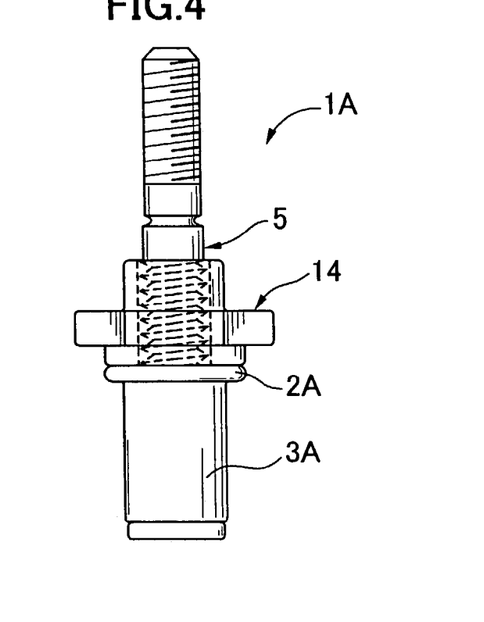
FIG. 4 is a front view showing one modification of the rivet body of the blind rivet in FIG. 1.

In the blind rivet shown in FIGS. 1 to 3, the rivet body flange 2 is formed in an annular shape having a given thickness and an outer diameter larger than the inner diameter of a mounting hole formed in the first attachment member and smaller than a mounting hole formed in a second attachment member. The outer periphery of the rivet body adjacent to the rivet body flange 2 is formed with a number of longitudinally extending knurls 10 in parallel with each other in the circumferential direction. After the blind rivet 1 is attached to the first attachment member such as a panel, the knurls 10 prevent the blind rivet 1 from axially slipping with respect to the first attachment member. In addition to the knurls, the surface of the rivet body flange 2 to be brought in to surface contact with the first attachment member may be formed with a protrusion or protrusions to be bitten into the surface of the first attachment member. The protrusion can provide more enhanced anti-slip effect. The rivet body portion having the knurls 10 is formed as a tubular thin-walled portion 11 having a relatively large outer diameter. This tubular thin-walled portion 11 is formed to be readily deformed or expanded radially outward in response to the pulling movement of the mandrel 5. As shown in FIG. 4, a blind rivet (1A) may have a simple hollow cylindrical shape like a rivet body 3A except for the rivet body flange 2A.

In the blind rivet 1, an external thread portion 13 is provided at least in a region of the mandrel 5 where after the attaching operation, it protrudes from the rivet body flange 2 and faces to the vicinity of the rivet body flange 2. In the illustrated blind rivet 1, the external thread portion 13 has a relatively long length. Specifically, before the attaching operation, the external thread portion 13 has one end facing to the inner surface of the tubular thin-walled portion 11 of the rivet body 3, but after the attaching operation, the one end thereof extends from the rivet body flange 2 and is disposed adjacent to the rivet body flange 2. The size and pitch of the external thread in the external thread portion 13 may be appropriately selected. The tubular thin-walled portion 11 has a first portion 37 having a first inner diameter, and a second portion 38 having a second inner diameter less than the first inner diameter. Disposed on the second portion 38 is an engagement member 40 which engages the portion 9 of the mandrel 5. The second portion 38 has a thickness greater than the thickness of the first portion 37.

Figure 5A:
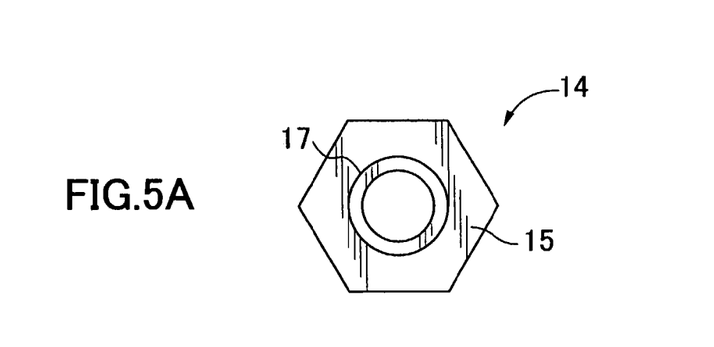
FIG. 5A is a plan view of the sleeve.
Figure 5B:
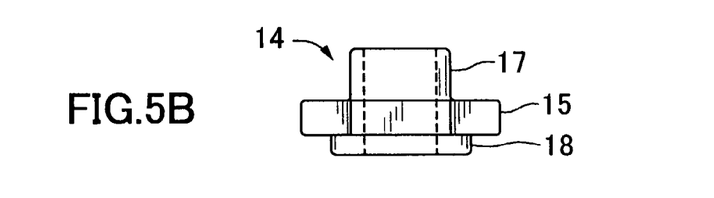
FIG. 5B is a front view of the sleeve.
Figure 5C:
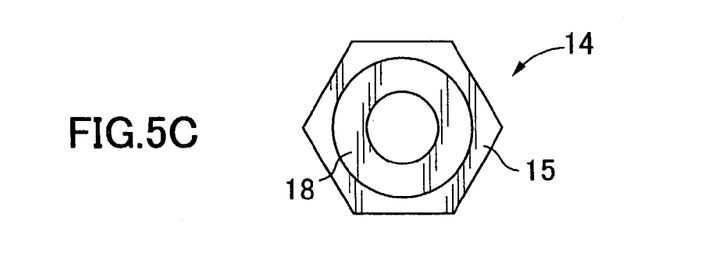
FIG. 5C is a bottom view of the sleeve.

The blind rivet 1 further comprises a tubular sleeve 14 which is formed separately from the mandrel 5 and the rivet body 3, and disposed adjacent to the rivet body flange 2 to surround the external thread portion 13 of the mandrel 5 protruding from the rivet body flange 2. The detail of the sleeve 14 is described additionally with reference to FIGS. 5A to 5O. The sleeve 14 includes a sleeve flange 15 for sandwiching the second attachment member between the sleeve flange 15 and the rivet body flange 2 of the rivet body 3, and a deformable swageable portion 17 to be deformed radially in a region of the sleeve 14 where it faces to the external thread portion 13 of the mandrel 5, so as to form an internal thread in the inner surface thereof. Preferably, the sleeve 14 is made of plastically deformable material such as soft metal to allow the swageable portion 17 to be swaged and deformed. The sleeve flange 15 has an outer diameter larger than the inner diameter of the mounting hole of the second attachment member, and a surface to be brought into surface contact with the second attachment member. The sleeve 14 further includes an annular receiving portion 18 extending from the sleeve flange 15 to the rivet body flange 2. The receiving portion 18 is not essential and can be omitted. The receiving portion 18 is formed in an annular shape having approximately the same size as that of the rivet body flange 2. That is, the receiving portion 18 is formed in an annular shape having an outer diameter larger than the inner diameter of the mounting hole of the first attachment member but smaller than the inner diameter of the mounting hole of the second attachment member, and is inserted into the mounting hole of the second attachment member. When the receiving portion 18 is inserted into the mounting hole of the second attachment member, it can adequately maintain not only the positioning between the blind rivet 1 and the first and second attachment members, but also the positioning between the first attachment member and the second attachment member. The respective thicknesses (=heights in the axial direction) of the receiving portion 18 and the rivet body flange 2 may be appropriately selected depending on the thickness of the second attachment member. While the total thickness of the receiving portion 18 and the rivet body flange 2 may be set to be equal to the thickness of the second attachment member, the total thickness of the receiving portion 18 and the rivet body flange 2 may be set at a smaller value than the thickness of the second attachment member to connect the second attachment member to the first attachment member more tightly, or may be set at a larger value than the thickness of the second attachment member to connect the second attachment member to the first attachment member more loosely. The first portion 11 of the rivet body 3 has an outer diameter. The outer diameter of the sleeve flange 15 is larger than the outer diameter of the rivet body flange 2. The outer diameter of the rivet body flange 2 is larger than the outer diameter of the first portion 11 of the rivet body 3.

In the illustrated embodiment, the sleeve flange 15 has a hexagonal shape, in a plan view, and a given thickness. Thus, a tool such as a wrench can be readily engaged with rotate sleeve flange 15 to rotate it axially. Before the swaging deformation, the swageable portion 17 has an inner diameter larger than the outer diameter of the thread in the external thread portion 13. After the portion 17 is deformed radially inward, the internal thread corresponding to the thread of the external thread portion is formed in the inner surface of the swageable portion 17. This deformation disenables the sleeve 14 to move axially with respect to the mandrel 5. The respective inner diameters of the sleeve flange 15 and the receiving portion is set to form therein a hollow portion having an inner diameter larger than the outer diameter of the thread in the external thread portion 13. Thus, before the deformation, the sleeve 14 can be inserted into the mandrel 5 to surround the external thread portion 13 of the rivet body flange 2 and disposed adjacent to the rivet body flange 2, as illustrated. Preferably, the sleeve 14 is formed with an engagement portion or portions (not shown) to be engaged with the external thread portion 13 of the mandrel 5 with a low frictional force before the deformation. This engagement portion can prevent the sleeve 14 assembled to the mandrel 5 from unintentionally disengaging therefrom. The engagement portion may be formed in a ring shape having the same outer diameter than that of mandrel 5, at the end of the swageable portion 17.

In order to pull the mandrel end portion 7 out of the rivet body 3, the mandrel 5 is formed with a breakable small diameter portion 19 for causing breakage in the mandrel end portion 7 to separate it from the remaining portion of the mandrel. In the blind rivet 1, the breakable small diameter portion 19 is formed in the region of the mandrel where it protrudes from the sleeve 14. The breakable small diameter portion 19 may be positioned at any position in the region of the mandrel protruding from the sleeve 14 after the attaching operation, but before the attaching operation, it may be invisibly covered by the swageable portion 17 of the sleeve 14. The strength of the breakable small diameter portion 19 is set depending on the force causing the expansion deformation in the rivet body 3 or the fastening force against the first attachment member, and the diameter of the breakable small diameter portion 19 is determined in conformity to the above strength.

Figure 6:
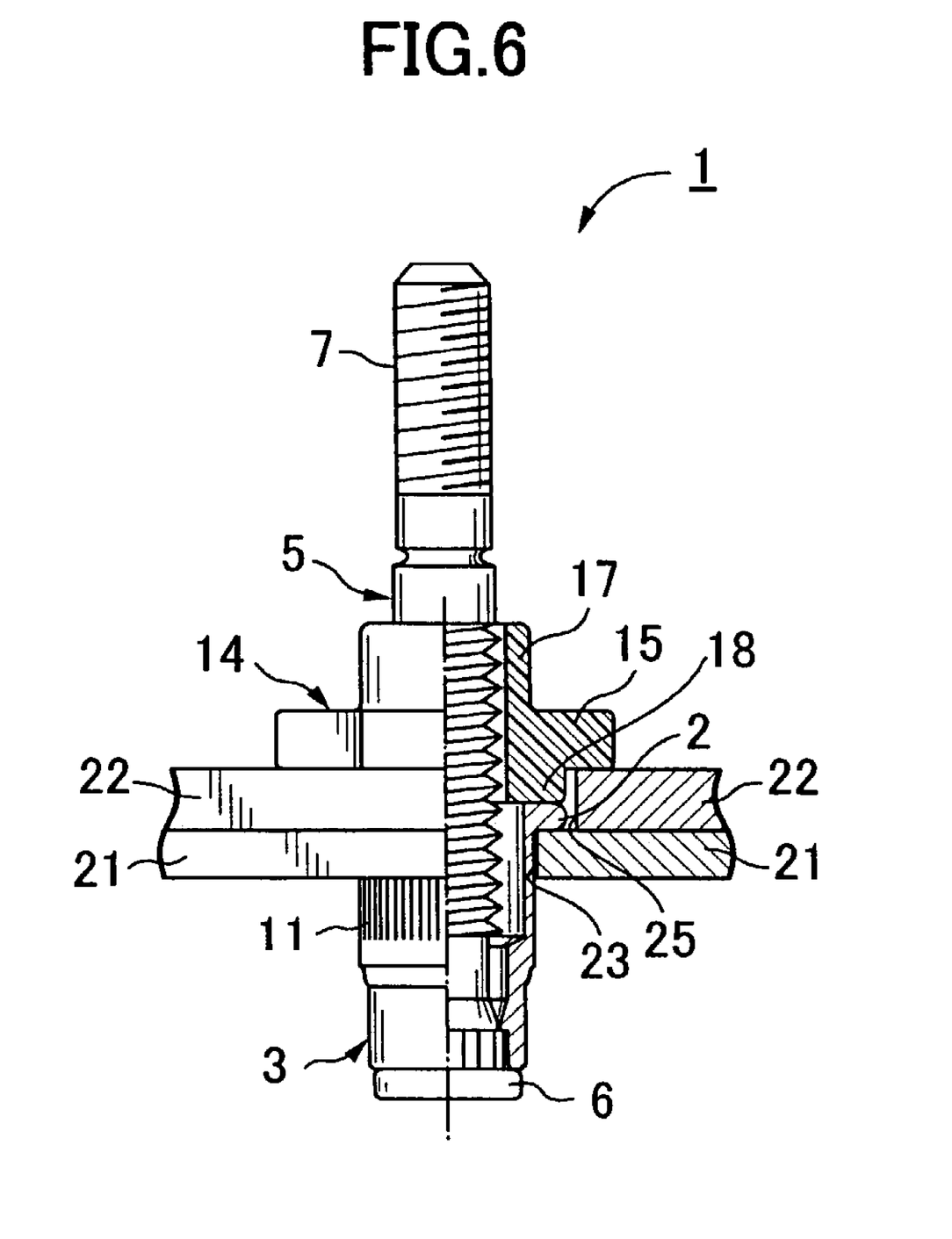
FIG. 6 is a half sectional front view showing steps of positioning a first attachment member and inserting the blind rivet in FIG. 1 in connection of the first attachment member to a second attachment member by using the blind rivet.
Figure 7A:
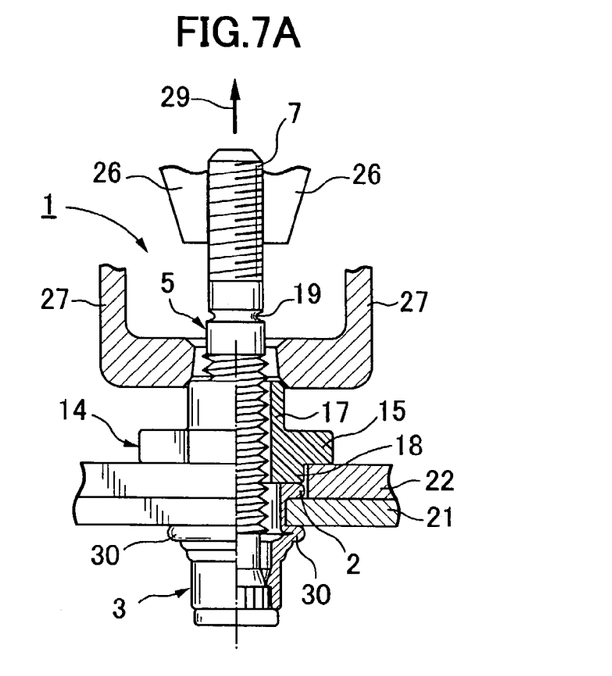
FIG. 7A is a half sectional front view showing the state when the blind rivet is attached to the first attachment member.
Figure 8:
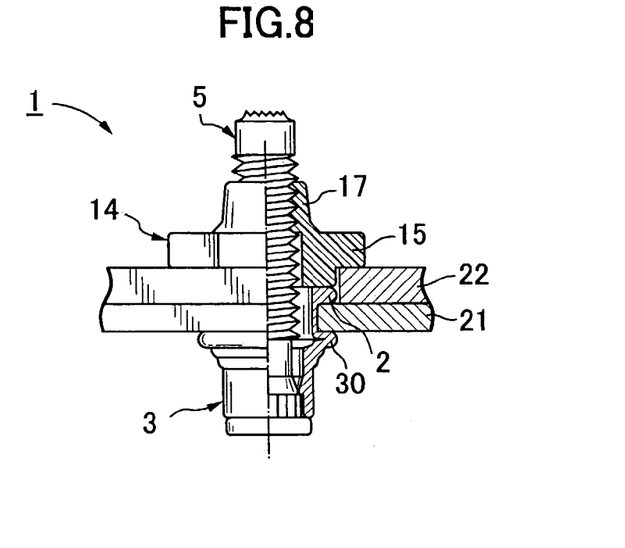
FIG. 8 is a half sectional front view showing the fastened blind rivet and the connected first and second attachment members after the completion of the attaching operation in FIG. 7B.

With reference to FIGS. 6 to 8, an operation of connecting a first attachment member 21 to a second attachment member 22 by using the aforementioned blind rivet will be described below. As shown in FIG. 6, a mounting hole 23 formed in the first attachment member 21 has an inner diameter slightly larger than the outer diameter of the thin-walled portion 11 of rivet body 3 of the blind rivet 1 but smaller than the respective outer diameters of the rivet body flange 2 and receiving portion 18 of the sleeve. A mounting hole 25 formed in the second attachment member 22 has an inner diameter larger than that of the mounting hole 23 of the first attachment member. More specifically, the inner diameter of the mounting hole 25 is slightly larger than the outer diameter of the rivet body flange 2 of the rivet body and the receiving portion 18 of the sleeve 14 but smaller than the outer diameter of the sleeve flange 15. In the operation of connecting the first attachment member 21 such as a panel to the second attachment member 22, the second attachment member 22 is first positioned to the first attachment member 21 such that the mounting hole 25 of the second attachment member 22 is aligned with the mounting hole 23 of the first attachment member 21. The blind rivet 1 is held by a setting tool or swaging tool. The setting tool may be appropriately selected from any suitable conventional setting tool, for example, disclosed in Japanese Patent Laid-Open No. 7-290183. When the mandrel end portion 7 of the blind rivet 1 is inserted into a nose of the setting tool, the blind rivet 1 is held by the setting tool in such a manner that the sleeve 14 and the rivet body protrude from the front end of the nose while locating the head 6 of the mandrel 5 in advance. While the setting tool is not illustrated in FIG. 6 for the sake of simplicity, FIG. 7A shows the setting tool wherein the mandrel end portion 7 is held by a pair of jaws 26 at the nose of the setting tool, and the sleeve 14 is disposed adjacent to a nosepiece 27 at the front end of the nose of the setting tool. The more detailed structure of the setting tool is disclosed in Japanese Patent Laid-Open No. 7-290183.

Figure 7B:
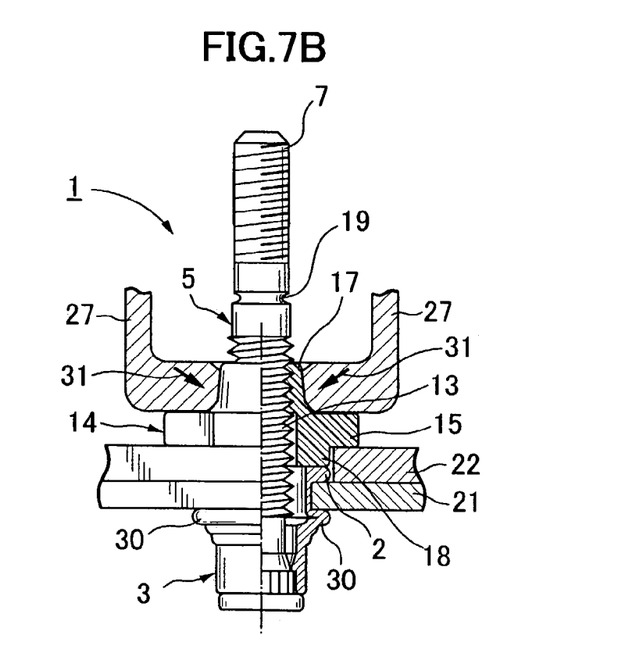
FIG. 7B is a half sectional front view showing the state when the second attachment member is connected to the first attachment member.

An operator carries a setting tool holding the blind nut at the front end of the nose, and inserts the rivet body 3 of the blind rivet 1 into the aligned mounting holes 23, 25 of the first and second attachment members while locating the head 6 in advance, until the rivet body flange 2 of the rivet body 3 is brought into surface contact with the first attachment member 21 while allowing the sleeve receiving portion 18 to be received in the mounting hole 23 of the first attachment member, and then, the sleeve flange 15 is brought into surface contact with the second attachment member 22, so as to allow the rivet body 3 to protrude from the rear side of the first attachment member 21. The tubular thin-walled portion 11 is disposed through the mounting holes 23 and 25 so as to position the thin-walled portion 11 adjacent to the first attachment member 21. FIG. 6 shows the above inserted state. The setting tool is activated while maintaining the inserted state in FIG. 6. FIGS. 7A and 7B show the state when the setting tool is activated. While the jaws 26 is not shown in FIG. 7B for the sake of simplicity, the jaws 26 remain holding the mandrel end portion 7, and applying a force for pulling the mandrel as shown in FIG. 7A.

While the attaching operation is illustrated as if the operations shown in FIGS. 7A and 7B are separately performed, these operations are simultaneously performed. In FIG. 7A, a strong force (shown by arrow 29), which is capable of pulling the mandrel end portion out of the first attachment member 21 and breaking the breakable small diameter portion 19, is applied to the mandrel end portion protruding from the sleeve 14, to expandedly deform the thin-walled portion 11 of the rivet body 3 protruding from the rear side of the first attachment member 21. The blind rivet 1 is firmly attached to the first attachment member 21 by means of the expandedly deformed portion 30 and the rivet body flange 2. Simultaneously, as shown in FIG. 7B, the inner surface of a tapered hole at the front end of the nosepiece 27 of the setting tool applies a strong force for compressing the swageable portion 17 radially inward to the swageable portion 17 of the sleeve 14 so as to press the inner surface of the swageable portion 17 onto the external thread portion 13 of the mandrel. Thus, the sleeve 14 of plastically deformable material allows an internal thread to be formed in the inner surface of the swageable portion 17 correspondingly to the external thread 13. The sleeve is connected to the external thread portion 13 of the mandrel 5 through a thread engagement to prevent the sleeve 14 from axially moving with respect to the mandrel 5. In this way, the sleeve flange 14 of the sleeve 14 is fixed to the rivet body 3 of the blind rivet 1 firmly attached to the first attachment member 21, and the sleeve flange 15 cooperates with the first attachment member 21 to sandwich the second attachment member 22 between the first attachment member 21 and the sleeve flange 15.

When the blind rivet 1 is attached to the first attachment member 21, and the second attachment member 22 is sandwiched between the sleeve flange 15 and the first attachment member 21, the jaws 26 of the setting tool pulls the mandrel end portion 7 with a maximized force to break the mandrel end portion 7 at the breakable small diameter portion 19, and the broken mandrel end portion is pulled out from the blind rivet 1. FIG. 8 shows the blind rivet 1 in which the mandrel end portion 7 is removed, and the attaching operation is finished. The blind rivet 1 is firmly attached to the first attachment member 21, and the second attachment member 22 is sandwiched between the sleeve flange 15 and the first attachment member 21. Thus, the second attachment member 22 is connected to the first attachment member 21.

Figure 9:
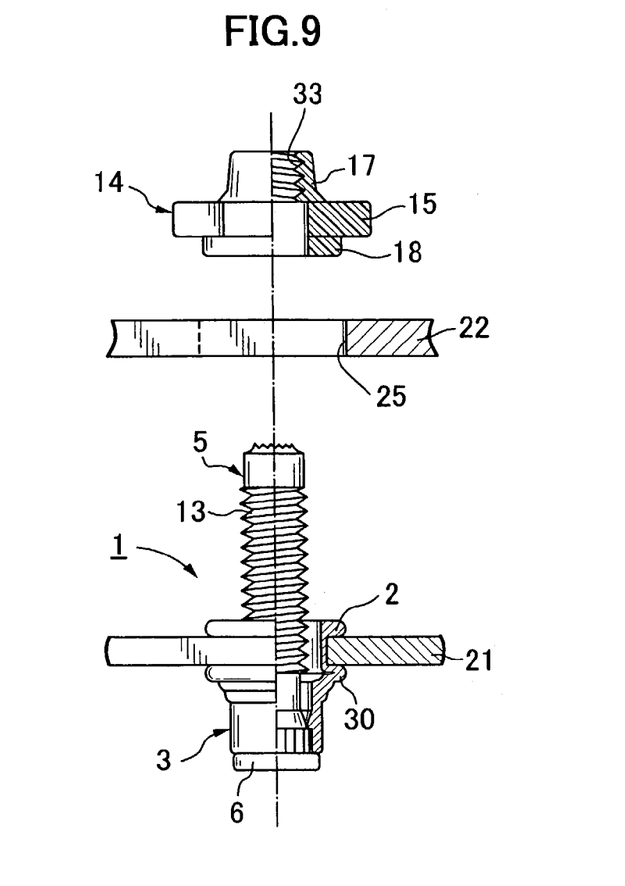
FIG. 9 is a half sectional front view showing the state when second attachment member is detached from the first attachment member after the attaching operation in FIG. 8

FIG. 9 shows a detaching operation of the second attachment member 22 from the first attachment member after the attaching operation. In the fastened state in FIG. 8, a tool such as a wrench is engaged with the sleeve flange 15 of the sleeve 14 to rotate the sleeve flange 15. During this operation, only the sleeve 14 is rotated because the rivet body 3 is firmly fastened to the first attachment member 21 by the expandedly deformed portion 30. Thus, the internal thread portion 33 formed in the inner surface of the swageable portion 17 is rotated along the external thread portion 13 of the mandrel 5 to loose the thread engagement. Then, the sleeve 14 can be detached from the mandrel 5, and the sleeve flange 15 is removed as shown in FIG. 9 to allow the second attachment member 22 to be detached. In this way, even after the attaching operation, the fastened second attachment member 22 can be detached through a simple operation from one side of the first and second attachment members. When the second attachment member is to be re-attached, the mounting hole 25 of the second attachment member 25 is be aligned with the mandrel 5 standing upright from the first attachment member 21 and the rivet body flange 2 to position the second attachment member 22 to the first attachment member 21, and then the sleeve 14 can be rotated and connected to the external thread portion 13 through the thread engagement.

Figure 10A:
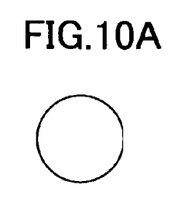
FIGS. 10A to 10E are views showing various modifications of a sleeve flange or a swageable portion of the sleeve.
Figure 10B:
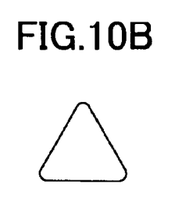
Figure 10C:
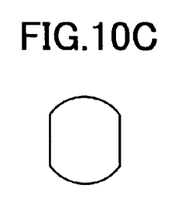
Figure 10D:
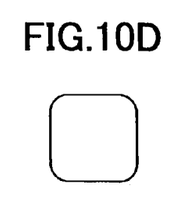
Figure 10E:
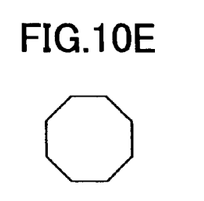

FIGS. 10A to 10E shows modifications of the respective shapes of the sleeve flange 15 and the swageable portion 17. While the sleeve flange 15 in the sleeve 14 of the above blind rivet 1 is formed as a hexagonal plate body capable of allowing a tool such as a wrench to be engaged therewith, a tool engagement portion may be formed on the swageable portion 17 as long as the sleeve 14 can be rotated. In this case, both or either one of the sleeve flange 15 and the swageable portion 17 may have a shape capable of defining at least one pair of parallel lines in plan view. This shape allows a tool to be engaged with the swageable portion 17. When either one of the sleeve flange 15 and the swageable portion 17 has a shape capable of providing at least one pair of parallel lines in a plan view, the remaining one may be form in an arbitrary shape including a circular shape such as perfect circle or oval, and a polygonal shape such as triangle or quadrangle. FIGS. 10A to 10E show several examples of the arbitrary shape, wherein FIG. 10A shows a pure circle shape, FIG. 10B showing a triangular shape, FIG. 10C showing an oval shape cut a circle by a pair of parallel lines, FIG. 10D showing a quadrangular shape, and FIG. 10E showing an octagonal shape.

Figure 11A:
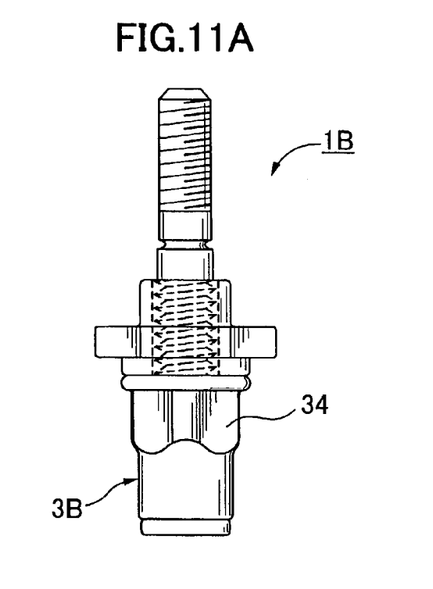
FIG. 11A is a front view of the blind rivet.
Figure 11B:
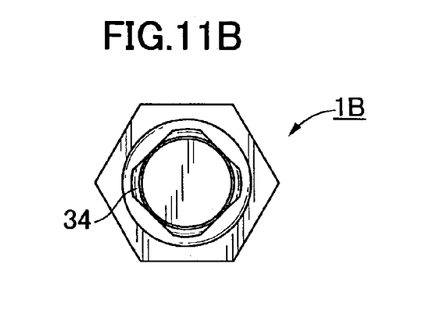
FIG. 11B is a bottom view of the blind rivet.
Figure 12A:
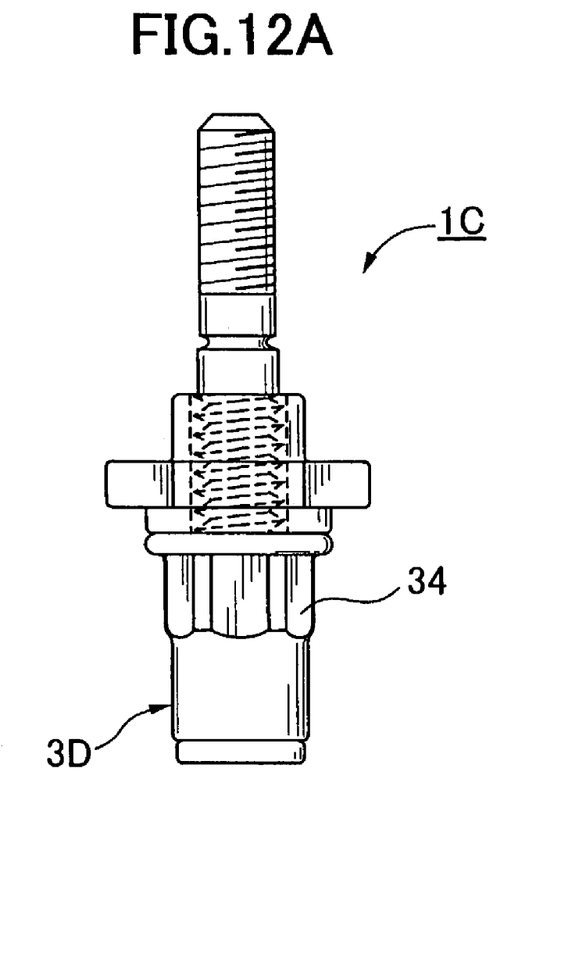
FIG. 12A is a front view of the blind rivet.
Figure 12B:
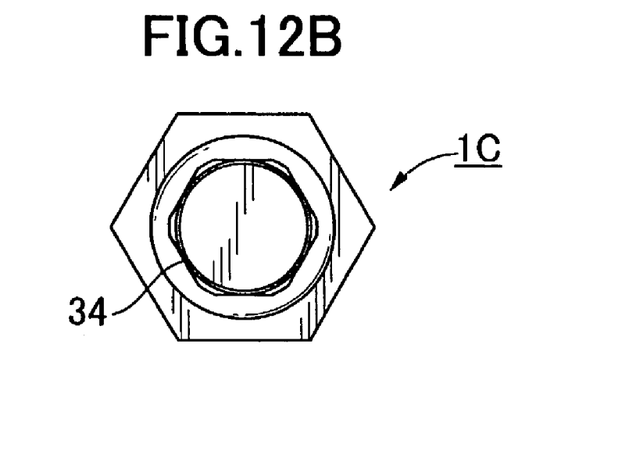
FIG. 12B is a bottom view of the blind rivet.

A blind rivet 1B in FIGS. 11A and 11B is different from the aforementioned blind rivet 1 in that a region 34 of a rivet body 3B adjacent to a flange thereof is formed in a quadrangular shape in cross section. In this case, a mounting hole of a first attachment member can be formed as a quadrangular hole in conformity with the quadrangular section in the region 34 adjacent to the flange of the rivet body 3B, to prevent the blind rivet 1 B from rotating with respect to the first attachment member. A blind rivet 1C in FIGS. 12A and 12B is different from the aforementioned blind rivet 1 in that a region 34 of a rivet body 3C adjacent to a flange thereof is formed in a hexagonal shape in cross section. In this case, a mounting hole of a first attachment member can be formed as a hexagonal hole in conformity with the hexagonal section in the region 34 adjacent to the flange of the rivet body 3C, to prevent the blind rivet 1C from rotating with respect to the first attachment member.

Figure 13:
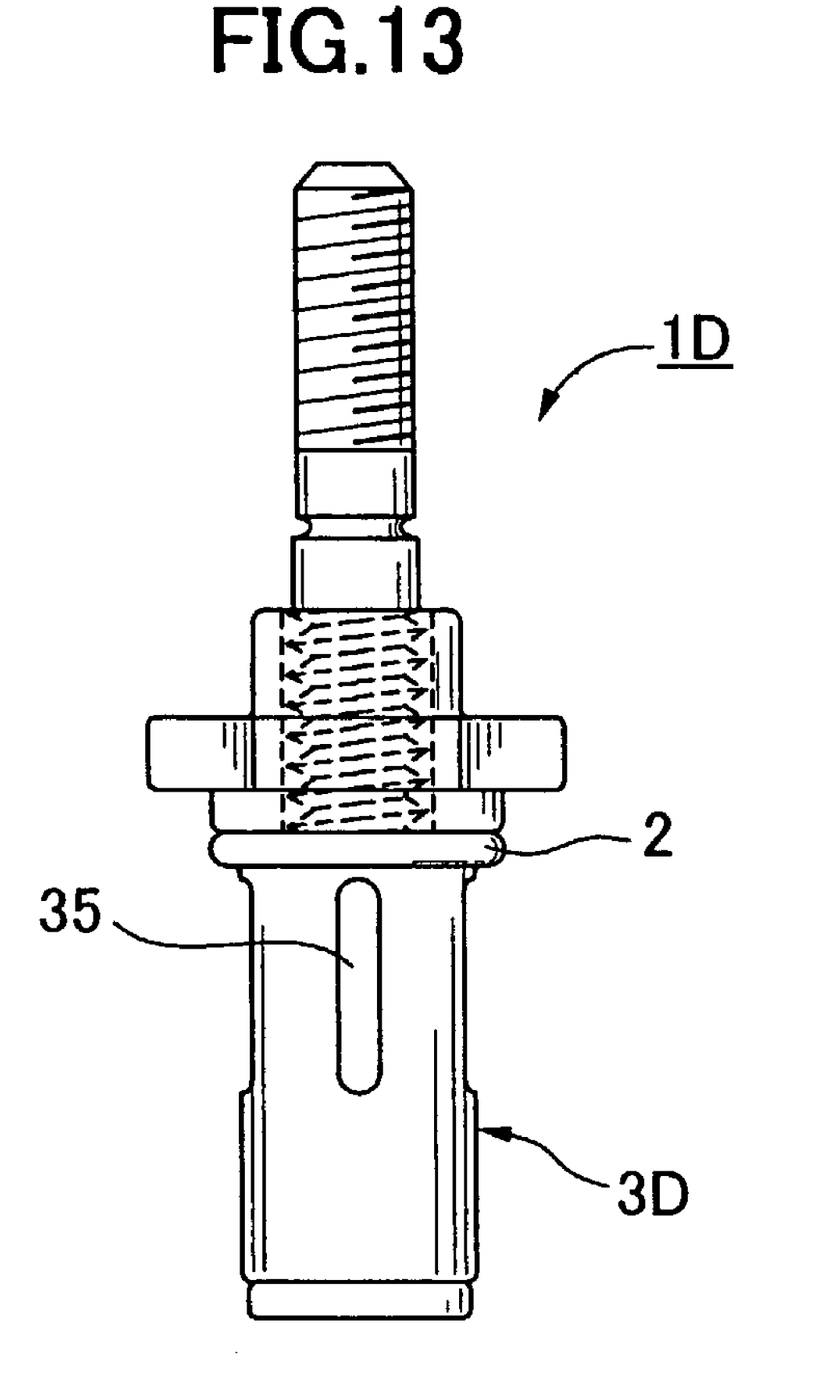
FIG. 13 is a front view a blind rivet having still another modified rivet body.

A blind rivet 1D in FIG. 13 is formed with a slit 35 extending longitudinally from a region of a rivet body 3D adjacent to a rivet body flange 2. The slits 35 may be provided in a plural number (four in this example) in the circumferential direction. The slits 35 allows the blind rivet to be reliably attached to the first attachment member even if the first attachment member is made of soft material such as soft plastic, or the first attachment member has a slightly larger mounting hole.

According to the blind rivet of the present invention, a strong force for pulling the rivet body out of the first attachment member can be applied to the mandrel portion protruding from the sleeve to allow the rivet body to be expandedly deformed so as to firmly fasten the first attachment member through the expandedly deformed portion and the rivet body flange. Simultaneously, a strong compression force can be applied to the swageable portion of the sleeve radially inward to form an internal thread corresponding to the external thread portion of the mandrel, in the inner surface of the swageable portion of the sleeve, so that the second attachment member can be sandwiched between the first attachment member and sleeve flange while preventing the sleeve from axially moving with respect to the mandrel. Thus, the attaching of the blind rivet to the first attachment member and the holding of the second attachment member can be carried out from one side of the first attachment member only by the attaching operation based on axial pulling and radial compression forces without any rotation operation. Through this attaching operation, the second attachment member can be connected to the first attachment member, and the rivet body of the blind rivet can be firmly attached to the first attachment member. This fastened state is reliably maintained. In addition, while the blind rivet of the present invention has the rivet body and the rivet body flange which are integrally formed, the sleeve, connected with the mandrel through the thread engagement, can be detached from the mandrel only by rotating the sleeve flange located on one side of the first attachment member or only through the rotation operation from one side, so that the second attachment member can be detached from the first attachment member after the completion of the detaching operation of the sleeve. Thus, even if the first attachment member is a large panel, the attaching and detaching operations can be completed from one side even by one operator.

I claim:

1. A blind rivet configured to connect a first sheet defining a first mounting hole and a second sheet defining a second mounting hole comprising:
   a hollow tubular rivet body having a rivet body flange formed at one of the ends thereof and adapted to be disposed in the second mounting hole of the second sheet, said rivet body having a first portion having a first thickness and a second portion having a second thickness which is greater than the first thickness, said first portion adapted to pass through the first mounting hole of the first sheet and having an outer diameter; and
   a mandrel having a shank passing through said rivet body and protruding from said rivet body flange and a large diameter head adjacent to the other end of said rivet body and opposite to said rivet body flange, wherein an end portion of said mandrel protruding from said rivet body flange can be pulled out from said rivet body to allow said head to deform and expand the first portion of said rivet body so that said blind rivet is attached to said first sheet by means of said expandedly deformed first portion and said rivet body flange, and
   wherein said mandrel has an external thread portion provided at least in such a region that after said blind rivet is attached, said mandrel protrudes from said rivet body flange and adjacent to said rivet body flange; and
   said blind rivet further comprises a tubular sleeve disposed adjacent to said rivet body flange to surround said mandrel protruding from said rivet body flange, said sleeve being formed separately from both said mandrel and said rivet body, said sleeve including a sleeve flange for sandwiching said second sheet between said first sheet and said sleeve flange, and a deformable swageable portion to be deformed radially in a region facing to said external thread portion of said mandrel, so as to form an internal thread in the inner surface thereof, the sleeve flange having an outer diameter,
   wherein said rivet body flange has an outer diameter larger than the inner diameter of said first mounting hole and smaller than the inner diameter of said second mounting hole and is adapted to abut a side of the first sheet adjacent to the second sheet before the first portion of the rivet body is deformed and expanded, the outer diameter of said sleeve flange being larger than the outer diameter of said rivet body flange, the outer diameter of said rivet body flange being larger than the outer diameter of said first portion of said rivet body.

2. The blind rivet as defined in claim 1, wherein said sleeve includes a bearing surface extending from said sleeve flange toward the rivet body flange, wherein the total thickness of said bearing surface and said rivet body flange is set depending on the thickness of said second sheet.

3. The blind rivet as defined in claim 2, wherein said sleeve is formed with an engagement engaged with said mandrel before deforming said swageable portion, so as to prevent said sleeve from unintentionally disengaging from said mandrel.

4. The blind rivet as defined in claim 3, wherein said mandrel is formed with a breakable small diameter portion for causing breakage in said end portion of said mandrel to separate it from the remaining portion of said mandrel, said breakable small diameter being formed in a region of said mandrel where it protrudes from said sleeve after an attaching operation.

5. The blind rivet as defined in claim 1, wherein the outer surface of said rivet body is formed with a plurality of longitudinally extending knurls aligned in the circumferential direction of said rivet body.

6. The blind rivet as defined in claim 5, which said rivet body flange capable of being formed with protrusions on the side adjacent to said first sheet to be bitten into the surface of said first sheet.

7. The blind rivet as defined in claim 1, wherein said rivet body has an outer surface adjacent to said rivet body flange, the outer surface being formed in a hexagonal shape or a quadrangular shape in cross section.

8. The blind rivet as defined in claim 1, wherein said rivet body is formed with a slit longitudinally extending in a region of said rivet body adjacent to said rivet body flange.

9. The blind rivet as defined in claim 1, wherein one of said sleeve flange and said swageable portion of said sleeve has a shape capable of defining at least one pair of parallel lines in plan view.

10. The blind rivet as defined in claim 1, wherein one of said sleeve flange and said swageable portion of said sleeve has a shape capable of defining at least one pair of parallel lines in plan view, and the other has an arbitrary shape.

11. A method of connecting, to a first attachment member, a second attachment member by using the blind rivet as defined in claim 1, comprising the steps of;

positioning said second attachment member to said first attachment member to align a second mounting hole formed in said second attachment member with a first mounting hole formed in said first attachment member, said first mounting hole having an inner diameter larger than the outer diameter of said rivet body but smaller than the outer diameter of said rivet body flange, said second mounting hole having an inner diameter larger than that of said first mounting hole but smaller than the outer diameter of said sleeve flange;

inserting said rivet body of said blind rivet into said aligned first and second mounting holes of said first and second attachment members, while locating said head in advance until said rivet body flange is brought into surface contact with said first attachment member, and said sleeve flange is brought into surface contact with said second attachment member, so as to allow said rivet body to protrude from the rear side of said first attachment member; and applying, to the end portion of said mandrel protruding from said sleeve, a strong force for pulling said end portion of said mandrel out of said first attachment member to allow a portion of said rivet body protruding from the rear side of said first attachment member to be expandedly deformed, so that said blind rivet is attached to said first attachment member by means of said expandedly deformed portion and said rivet body flange, and also applying, to said sleeve, a strong force for radially compressing said swageable portion to allow the inner surface of said swageable portion to be pressed onto said external thread portion of said mandrel and formed with an internal thread corresponding to the external thread of said external thread portion, so that said second attachment member is sandwiched between said sleeve flange and said first attachment member while preventing said sleeve from axially moving with respect to said mandrel.

12. A blind rivet configured to connect a first sheet defining a first mounting hole and a second sheet defining a second mounting hole comprising:

a hollow tubular rivet body having a rivet body flange formed at a first end thereof, said rivet body having a first portion having a first thickness and an outer diameter and a second portion having a second thickness which is greater than the first thickness, the first portion adapted to pass through the first mounting hole;

a mandrel having a shank passing through said rivet body and protruding from said rivet body flange and a large diameter head adjacent to a second end of said rivet body and opposite to said rivet body flange, wherein an end portion of said mandrel protruding from said rivet body flange is configured to be pulled out from said rivet body to allow said head to deform and expand the first portion of said rivet body so that said first sheet is clamped by said expandedly deformed first portion on a first side and by said rivet body flange on a second side, thus attaching said blind rivet to said first sheet, said mandrel having an external thread portion provided at least in such a region that after the blind rivet is attached to the first sheet, said mandrel protrudes from said rivet body flange and adjacent to said rivet body flange; and a tubular sleeve disposed adjacent to said rivet body flange to surround said mandrel portion protruding from said rivet body flange, said sleeve being formed separately from both said mandrel and said rivet body, said sleeve including a sleeve flange for sandwiching said second sheet between said first sheet and said sleeve flange, and a deformable swageable portion to be deformed radially in a region facing to said external thread portion of said mandrel, so as to form an internal thread in the inner surface thereof, said sleeve flange having an outer diameter, wherein said rivet body flange has an outer diameter larger than the inner diameter of said first mounting hole and smaller than the inner diameter of said second mounting hole, and wherein the rivet body flange is adapted to abut the second side of the first sheet before the first portion of the rivet body is deformed and expanded, the outer diameter of said sleeve flange being larger than the outer diameter of said rivet body flange, the outer diameter of said rivet body flange being larger than the outer diameter of said first portion of said rivet body.

13. The blind rivet as defined in claim 12, wherein said sleeve includes a bearing surface extending from said sleeve flange toward the rivet body flange, wherein the total thickness of said bearing surface and said rivet body flange is set as a function of the thickness of said second sheet.

14. The blind rivet as defined in claim 12, wherein said rivet body flange has an outer diameter larger than the inner diameter of said first mounting hole defined by said first sheet and smaller than said second mounting hole defined by said second sheet.

15. The blind rivet as defined in claim 12, wherein said rivet body flange abuts said first sheet and lies at least partially within a mounting hole of said second sheet.

16. An assembly comprising:
a first member defining a first mounting hole;
a second member defining a second mounting hole with an inner diameter larger than an inner diameter of the first mounting hole; and
a blind rivet comprising:
a hollow tubular rivet body having a rivet body flange formed at a first end thereof, said rivet body having a first portion having a first thickness and a second portion having a second thickness which is greater than the first thickness;
a mandrel having a shank passing through said rivet body and protruding from said rivet body flange and a large diameter head adjacent to a second end of said rivet body and opposite to said rivet body flange, wherein an end portion of said mandrel protruding from said rivet body flange can be pulled out from said rivet body to allow said head to deform and expand the first portion of said rivet body so that said blind rivet engages said first member by means of said expandedly deformed first portion on a first side of said first member and said rivet body flange on a second side of said first member, said mandrel having an external thread portion provided at least in such a region that after said blind rivet engages said first member, said mandrel protrudes from said flange and adjacent to said rivet body flange; and
a tubular sleeve disposed adjacent to said rivet body flange to surround said mandrel portion protruding from said rivet body flange, said sleeve being formed separately from both said mandrel and said rivet body, said sleeve including a sleeve flange for sandwiching said second member between said first member and said sleeve flange, and a deformable swageable portion to be deformed radially in a region facing to said external thread portion of said mandrel, so as to form an internal thread in the inner surface thereof,
wherein said rivet body flange has an outer diameter larger than the inner diameter of said first mounting hole and smaller than the inner diameter of said second mounting hole, and wherein said rivet body flange abuts the second side of the first member before the first portion of the rivet body is deformed and expanded.

17. The assembly as defined in claim 16, wherein said sleeve includes a bearing surface extending from said sleeve flange toward the rivet body flange, wherein the total thickness of said bearing surface and said rivet body flange is a function of the thickness of said second member.

18. The assembly as defined in claim 16, wherein said rivet body flange lies at least partially within said mounting hole of said second member.

* * * * *